United States Patent

Reuter et al.

Patent Number: 5,086,157
Date of Patent: Feb. 4, 1992

[54] AROMATIC POLYETHER SULPHONES BASED ON DIHYDROXY-DIPHENYL-CYCLO-ALKANES AND FILMS THEREFROM

[75] Inventors: Knud Reuter; Dieter Freitag, both of Krefeld; Günther Weymans, Leverkusen; Rolf Dhein, Krefeld; Erich Meier, Leverkusen; Gerold Müller, Krefeld, all of Fed. Rep. of Germany

[73] Assignee: Bayer Aktiengesellschaft, Leverkusen, Fed. Rep. of Germany

[21] Appl. No.: 413,505

[22] Filed: Sep. 27, 1989

[30] Foreign Application Priority Data

Oct. 1, 1988 [DE] Fed. Rep. of Germany ....... 3833385
Oct. 24, 1988 [DE] Fed. Rep. of Germany ....... 3836162

[51] Int. Cl.$^5$ .............................................. C08G 75/00
[52] U.S. Cl. ..................................... 528/171; 528/174
[58] Field of Search ................................ 528/171, 174

[56] References Cited

U.S. PATENT DOCUMENTS

| | | | |
|---|---|---|---|
| 3,271,367 | 9/1966 | Schnell et al. | 528/171 |
| 4,010,147 | 3/1977 | Rose | 260/79.3 |
| 4,175,175 | 11/1979 | Johnson et al. | 528/125 |
| 4,533,721 | 8/1985 | Kurosawa et al. | 528/174 |
| 4,598,137 | 7/1986 | Guiver et al. | 528/173 |
| 4,661,581 | 4/1987 | Nozawa et al. | 528/176 |
| 4,776,999 | 10/1988 | Kohn | 264/41 |

FOREIGN PATENT DOCUMENTS 60-53534 3/1985 Japan.
1078234 8/1967 United Kingdom.

*Primary Examiner*—John Kight, III
*Assistant Examiner*—T. Mosley
*Attorney, Agent, or Firm*—Joseph C. Gil; Richard E. L. Henderson

[57] ABSTRACT

Polyether sulphones based on diphenols corresponding to the following general formula (I):

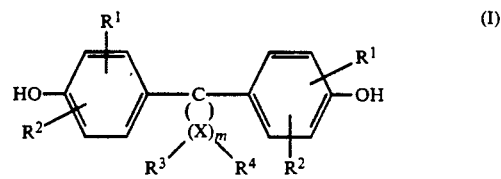

wherein
$R^1$ and $R^2$, independently represent hydrogen, halogen, $C_1$-$C_8$ alkyl, $C_5$ or $C_6$ cycloalkyl, $C_6$-$C_{10}$ aryl, or $C_7$-$C_{12}$ aralkyl; m represents an integer of from 4 to 7;
$R^3$ and $R^4$, may be selected individually for each X and independently represent hydrogen or $C_1$-$C_6$ alkyl, and
X represents carbon;
with the proviso that, on at least one atom X, $R^3$ and $R^4$ both represent alkyl, the production thereof, films made from these polyether sulfones, composite films with other plastic materials and application of the films in gas permeation.

10 Claims, No Drawings

AROMATIC POLYETHER SULPHONES BASED ON DIHYDROXY-DIPHENYL-CYCLO-ALKANES AND FILMS THEREFROM

This invention relates to aromatic polyether sulphones (and to a process for the production thereof) based on dihydroxy-diphenyl-cycloalkanes corresponding to the following general formula (I):

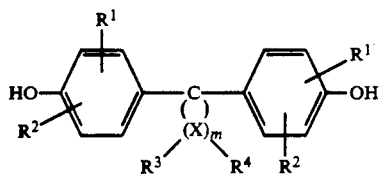

wherein $R^1$ and $R^2$, independently represent hydrogen, halogen, preferably chlorine or bromine, $C_1$–$C_8$ alkyl, $C_5$ or $C_6$ cycloalkyl, $C_6$–$C_{10}$ aryl, preferably phenyl, or $C_7$–$C_{12}$ aralkyl, preferably phenyl-$C_1$–$C_4$-alkyl, in particular benzyl or cumyl;

m represents an integer of from 4 to 7, preferably 4 or 5;

$R^3$ and $R^4$, may be selected individually for each X and independently represent hydrogen or $C_1$–$C_6$ alkyl and X represents carbon;

with the proviso that, on at least one atom X, $R^3$ and $R^4$ both represent alkyl.

This invention also relates to films made from these polyether sulfones, composite films with other plastic materials and to the application of the films in gas permeation.

Preferably, $R^3$ and $R^4$ simultaneously represent alkyl on one or two atoms X, in particular only on one atom X. The preferred alkyl radical is methyl; the X atoms in the α-position to the di-phenyl-substituted carbon atom (C-1) are preferably not dialkyl-substituted, and in contrast alkyl-disubstitution in the β-position to C-1 is preferred.

Alkyl-disubstitution in the β-position and monoalkyl-substitution in the other β-position, is particularly preferred.

Particularly preferred starting materials are dihydroxydiphenylcycloalkanes having 5 to 6 ring carbon atoms in the cycloaliphatic radical [m represents 4 or 5 in general formula (I)], such as the diphenols:

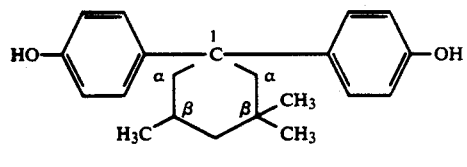

and

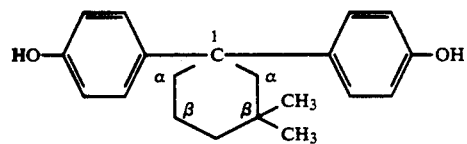

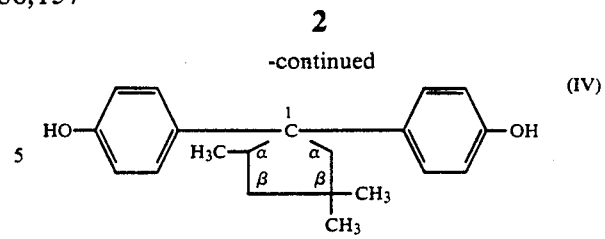

1,1-bis-(4-hydroxy-phenyl)-3,3,5-trimethyl-cyclohexane(II) being particularly preferred.

Dihydroxy-diphenyl-cycloalkanes (I) may be produced in known manner by condensation of phenols (V):

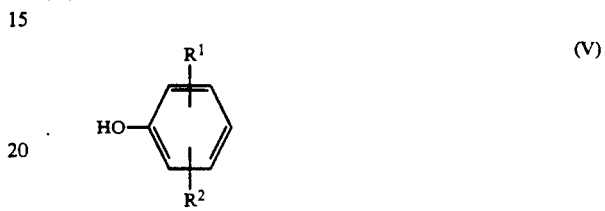

and ketones (VI):

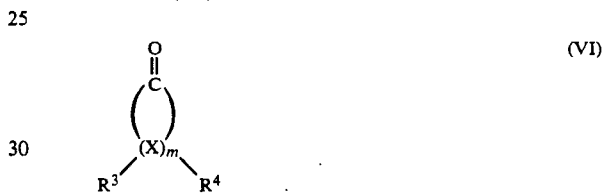

wherein, X, $R^1$, $R^2$, $R^3$, $R^4$ and m are as defined in connection with general formula (I).

The phenols (V) are either known from the literature or are obtainable by processes known from the literature (c.f. e.g. Ullmann, Encyklopädie der technischen Chemie, 4th edition, volume 15, p. 61-77).

Examples of suitable phenols (V) are phenol, o-cresol, m-cresol, 2,6-dimethyl-phenol, 2-chlorophenol, 3-chlorophenol, 2,6-dichlorophenol, 2-cyclohexyl-phenol, diphenyl-phenol, o-phenyl-phenol and o- or p-benzyl-phenols.

The ketones (VI) are known from the literature (see, for example, Beilsteins Handbuch der organischen Chemie, 4th edition, volume 7); a general process for the preparation of ketones (VI) is described, for example, in "Organikum", 15th edition, 1977, VEB-Deutscher Verlag der Wissenschaften Berlin, p. 698.

Examples of known ketones (VI) are:
3,3-dimethyl-cyclopentanone, 2,2-dimethyl-cyclohexanone, 3,3-dimethyl-cyclohexanone, 4,4-dimethyl-cyclohexanone, 3-ethyl-3-methyl-cyclopentanone, 2,3,3-trimethyl-cyclopentanone, 2,4,4-trimethyl-cyclopentanone, 3,3,4-trimethyl-cyclopentanone, 3,3-dimethyl-cycloheptanone, 4,4-dimethyl-cycloheptanone, 3-ethyl-3-methyl-cyclohexanone, 4-ethyl-4-methyl-cyclohexanone, 2,3,3-trimethyl-cyclohexanone, 2,4,4-trimethyl-cyclohexanone, 3,3,4-trimethyl-cyclohexanone, 2,5,5-trimethyl-cyclohexanone, 3,3,5-trimethyl-cyclohexanone, 3,4,4-trimethyl-cyclohexanone, 2,3,3,4-tetramethyl-cyclopentanone, 2,3,4,4-tetramethyl-cyclopentanone, 3,3,4,4-tetramethyl-cyclopentanone, 2,2,5-trimethyl-cycloheptanone, 2,2,6-trimethyl-cycloheptanone, 2,6,6-trimethyl-cycloheptanone, 3,3,5-trimethyl-cycloheptanone, 3,5,5-trimethyl-cycloheptanone, 5-ethyl-2,5-dimethyl-cycloheptanone, 2,3,3,5-tetramethyl-cycloheptanone, 2,3,5,5-tetramethyl-cycloheptanone, 3,3,5,5-tetramethyl-cycloheptanone, 4-ethyl-2,3,4-trimethyl-cyclopentanone, 2-isopropyl-4,4-dimethyl-cyclopentanone, 4-isopropyl-2,4-dimethyl-cyclopentanone, 2-ethyl-3,5,5-trimethyl-cyclohexanone, 3-ethyl-3,5,5-trimethyl-cyclohexanone, 3-ethyl-4-isopropyl-3-methyl-cyclopentanone, 4-sec.-butyl-3,3-dimethyl-cyclopentanone, 2-isopropyl-3,3,4-trimethyl-cyclopentanone, 3-ethyl-4-isopropyl-3-methyl-cyclohexanone, 4-ethyl-3-isopropyl-4-methyl-cyclohexanone, 3-sec.-butyl-4,4-dimethyl-cyclohexanone, 3-isopropyl-3,5,5-trimethyl-cyclohexanone, 4-isopropyl-3,5,5-trimethyl-cyclohexanone, 3,3,5-trimethyl-5-propyl-cyclohexanone, 3,5,5-trimethyl-5-propyl-cyclohexanone, 2-butyl-3,3,4-trimethyl-cyclopentanone, 2-butyl-3,3,4-trimethyl-cyclohexanone, 4-butyl-3,3,5-trimethyl-cyclohexanone, 3-isohexyl-3-methyl-cyclohexanone, 5-ethyl-2,4-diisopropyl-5-methyl-cyclohexanone, 2,2-dimethyl-cyclooctanone and 3,3,8-trimethyl-cyclooctanone.

Examples of preferred ketones are:

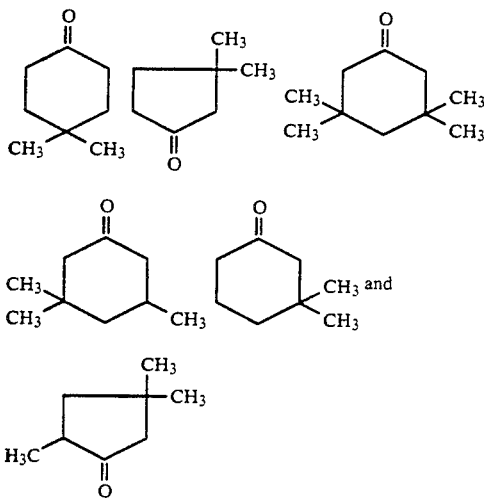

Generally, to prepare the bisphenol, from 2 to 10 mol, preferably from 2.5 to 6 mol, of phenol (V) are used per mol of ketone (VI). Preferred reaction times are from 1 to 100 hours. The reaction is generally carried out at temperatures of from −30 to +300° C., preferably from −15 to 150° C., under pressures of from 1 to 20 bar, preferably from 1 to 10 bar.

The condensation is generally carried out in the presence of acid catalysts. Examples are hydrogen chloride, hydrogen bromide, hydrogen fluoride, boron trifluoride, aluminium trichloride, zinc dichloride, titanium tetrachloride, tin tetrachloride, phosphorus halides, phosphorus pentoxide, phosphoric acid, concentrated hydrochloric or sulphuric acid, and mixtures of acetic acid and acetic anhydride. It is also possible to use acid ion exchangers.

The reaction may moreover be accelerated by addition of co-catalysts, such as $C_1$–$C_{18}$ alkyl-mercaptans, hydrogen sulphide, thiophenols, thio-acids and dialkyl sulphides.

The condensation may be carried out without a solvent or in the presence of an inert solvent (e.g. aliphatic and aromatic hydrocarbons or chlorohydrocarbons).

In cases where the catalyst simultaneously functions as the dehydrating agent, it is not necessary additionally to employ a dehydrating agent, but the latter is advantageous for achieving good conversions in all cases where the catalyst employed does not bind the water resulting from the reaction.

Examples of suitable dehydrating agent are: acetic anhydride, zeolites, polyphosphoric acid and phosphorus pentoxide.

The preparation of the diphenols (I) is described in German Application P 383 296.6 and is illustrated by Example 1.

This invention relates to aromatic polyether sulphones having the recurring structural unit

wherein —E'— represents a divalent radical of an aromatic sulphone corresponding to the following general formula (VIIIa):

wherein Ar and Ar', which may be the same or different, represent difunctional aromatic radicals having from 6 to 50 carbon atoms; and wherein

represents a divalent diphenolate radical, which are characterized in that from 0.1 to 100 mol%, preferably from 3 to 100 mol%, more preferably from 10 to 100 mol%, of the diphenolate radicals (IXa) correspond to the following general formula (Ia):

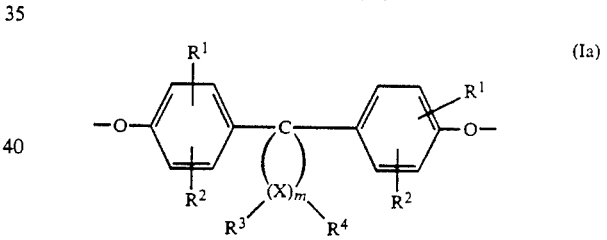

wherein X, $R^1$, $R^2$, $R^3$, $R^4$ and m are as defined in connection with general formula (I). The aromatic polyether sulphones according to the present invention preferably have average molecular weights $\overline{M}_w$ (weight-average), of from 758 to 500,000, preferably from 3,000 to 200,000, more preferably from 5,000 to 100,000.

Aromatic polyether sulphones are known (see, for example, GB-PS 1,078,234, U.S. Pat. Nos. 4,010,147 and EP-A 0 135 938). They may be prepared, for exam by reaction of dialkali metal salts of diphenols with dihalogeno-diaryl sulphones in a polar solvent (see, for example, GB-PS 1,078,234), it also being possible for the dialkali metal salts of the diphenols to be produced in situ.

The polyether sulphones according to the present invention may likewise be prepared by this method, the polar solvent employed preferably being caprolactam which is $C_1$–$C_5$ alkyl-substituted on the nitrogen, such as N-methyl-caprolactam, N-ethyl-caprolactam, N-n-propyl-caprolactam or N-isopropyl-caprolactam, preferably N-methyl-caprolactam, and preferably pyrrolidones which are pyrrolidone, or N,N-dimethyl-formamide, N,N-dimethylacetamide, dimethyl-sulphoxide, diphenyl-sulphone, sulpholane and tetramethylurea. A proportion, e.g. from 0.1 to 200 wt.%, based on the weight of the polar solvent, of other less polar solvents may be used simultaneously, e.g. aromatic hydrocarbons, such as toluene, xylene, mesitylene or chlorobenzene, or aliphatic hydrocarbons, such as benzine or cyclohexane.

The present invention also relates to a process for the production of the polyether sulphones, containing the structural unit (VII), by reaction of dialkali metal diphenolates (IXb):

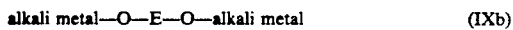

with dihalogeno-diaryl sulphones (VIII):

wherein Ar and Ar', represent the same or different difunctional aromatic radicals having from 6 to 50 carbon atoms; and Hal represents halogen, preferably fluorine, chlorine bromine, in polar solvents, which is characterized in that from 0.1 to 100 mol.%, preferably from 3 to 100 mol.%, more preferably from 10 to 100 mol.%, of the dialkali metal diphenolates (IXb) correspond to the following general formula (Ib):

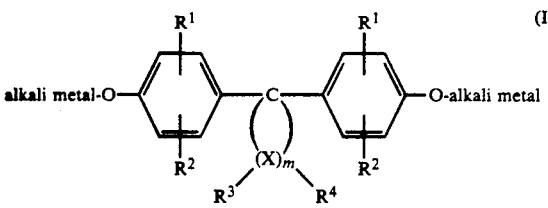

wherein X, $R^1$, $R^2$, $R^3$, $R^4$ and m are as defined in connection with general formula (I); and in that the reaction is carried out in a polar solvent, such as N-alkylated caprolactams or N-alkylated pyrrolidones, preferably in N-alkylated pyrrolidones.

Suitable diphenols (IX) are, e.g.:
hydroquinone,
resorcinol,
dihydroxy-diphenyls,
bis-(hydroxy-phenyl)-alkanes,
bis-(hydroxy-phenyl)-cycloalkanes,
bis-(hydroxy-phenyl)-sulphides,
bis-(hydroxy-phenyl)-ethers,
bis-(hydroxy-phenyl)-ketones,
bis-(hydroxy-phenyl)-sulphones,
bis-(hydroxy-phenyl)-sulphoxides,
α, α'-bis-(hydroxy-phenyl)-diisopropyl-benzenes
and nuclear-alkylated and nuclear-halogenated compounds thereof.

These and other suitable diphenols (IX) are described, e.g., in U.S. Pat. Nos. 3,028,365; 2,999,835; 3,148,172; 3,275,601; 2,991,273; 3,271,367; 3,062,781; 2,970,131 and 2,999,846, in German Offenlegungsschrift Nos. 1,570,703; 2,063,050; 2,063,052 and 2,211,0956, in French Patent No. 1,561,518 and in the monograph "H. Schnell, Chemistry and Physics of Polycarbonates, Interscience Publishers, New York 1964".

Examples of preferred other diphenols (IX) are:
4,4'-dihydroxy-diphenyl,
2,2-bis-(4-hydroxy-phenyl)-propane,
2,4-bis-(4-hydroxy-phenyl)-2-methylbutane,
1,1-bis-(4-hydroxy-phenyl)-cyclohexane,
α, α'-bis-(4-hydroxy-phenyl)-p-diisopropyl-benzene,
2,2-bis-(3-methyl-4-hydroxy-phenyl)-propane,
2,2-bis-(3-chloro-4-hydroxy-phenyl)-propane,
bis-(3,5-dimethyl-4-hydroxy-phenyl)-methane,
2,2-bis-(3,5-dimethyl-4-hydroxy-phenyl)-propane,
bis-(3,5-dimethyl-4-hydroxy-phenyl)-sulphone,
2,4-bis-(3,5-dimethyl-4-hydroxy-phenyl)-2-methylbutane,
1,1-bis-(3,5-dimethyl-4-hydroxy-phenyl)-cyclohexane,
α, α'-bis-(3,5-dimethyl-4-hydroxy-phenyl)-p-diisopropyl-benzene,
2,2-bis-(3,5-dichloro-4-hydroxy-phenyl)-propane,
2,2-bis-(3,5-dibromo-4-hydroxy-phenyl)-propane and
4,4'-dihydroxy-diphenyl-sulphone.

Examples of particularly preferred other diphenols are:
2,2-bis-(4-hydroxy-phenyl)-propane,
2,2-bis-(3,5-dimethyl-4-hydroxy-phenyl)-propane,
2,2-bis-(3,5-dichloro-4-hydroxy-phenyl)-propane,
2,2-bis-(3,5-dibromo-4-hydroxy-phenyl)-propane,
1,1-bis-(4-hydroxy-phenyl)-cyclohexane and
4,4'-dihydroxy-diphenyl-sulphone.

They may be employed individually or as mixtures.

The general formulae (IXa) and (IXb) represent the radicals of these phenols formed by removal of two hydrogen atoms and the alkali metal salts of these compounds.

Suitable dihalogenodiaryl sulphones (VIII) are, e.g.:
4,4'-dichlorodiphenyl-sulphone,
4,4'-difluorodiphenyl-sulphone,
4-chloro-4'-fluorodiphenyl-sulphone,
3,3'-dinitro-4,4'-dichlorodiphenyl-sulphone,
3,3'-dinitro-4,4'-difluorodiphenyl-sulphone,
4,4'-dibromodiphenyl-sulphone,

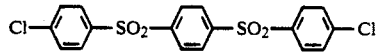

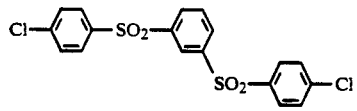

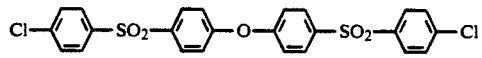

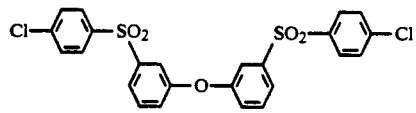

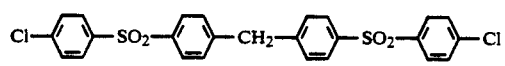

Preferably in general formula (VIII) accordingly: Ar and Ar' represent p-phenylene radicals or p-phenylene radicals substituted by alkyl or nitro groups, or radicals:

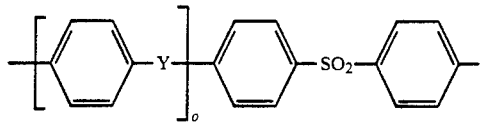

wherein Y represents —O—, CH$_2$, —SO$_2$— or a single bond; o represents 0 or 1; and Hal represents fluorine, chlorine or bromine.

Sodium or potassium is preferably the alkali metal in the dialkali metal phenolates (Ib) and (IXb).

Chlorine or fluorine, in particular chlorine is preferably the halogen in the dihalogenodiaryl sulphones (VIII).

Preferred polyether sulphones according to the present invention are those which contain at least 10 mol.% recurring units:

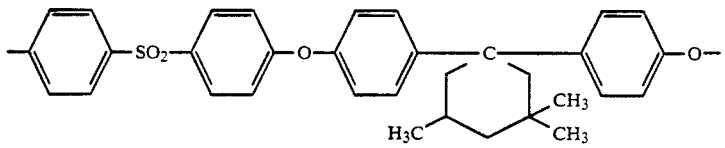

and have a molecular weight (weight-average) of more than 3,000 g/mol.

The aromatic polyether sulphones may be prepared according to the present invention at temperatures of from 130 to 320° C., preferably from 145° C. to 280° C., under pressures of from 0.8 to 10 bar, preferably from 1 to 3 bar, in particular under ambient atmospheric pressure.

The molar ratio of the alkali metal diphenolates (Ib) and (IXb) to the dihalogeno-diaryl sulphones (VIII) is from 0.5:1 to 2:1, preferably from 0.8:1 to 1.2:1, more preferably from 0.95:1 to 1.05:1, it necessary to choose a ratio of 1:1 or very close to 1:1 for high molecular weights.

The amount of polar solvents is from 0.5 to 50, preferably from 2 to 20, parts, by weight, based on the total weight of the components which form the polyether sulphone.

The polyether sulphones according to the present invention may be obtained from the resulting reaction mixtures as follows:

The reaction mixture is diluted, especially if very highly viscous solutions are present, e.g. with the polar reaction solvent or another solvent for the polyether sulphone and is filtered. After neutralization of the filtrate with a suitable acid, e.g. acetic acid, the polyether sulphone is precipitated by pouring into a suitable precipitation medium, e.g. water, alcohols (such as methanol or isopropanol) or water-alcohol mixtures, e.g. H$_2$O/methanol 1:1, and is isolated and then dried.

The polyether sulphones according to the present invention are thermoplastics having a high heat distortion point.

They may be processed, for example, by extrusion, injection moulding, sintering or pressing.

Various desired shaped articles may be produced. These may be employed in all instances where polyether sulphones of high dimensional stability are required, that is to say, for example, in the field of electrical engineering and electronics, for vehicle construction, including air and space travel, for sports equipment, functional components and tableware, and for microwave ovens, sterilizable medical equipment, coffee machine components, egg-boilers, hot water tanks, pipelines and pumps, hair driers and many more similar uses.

The customary additives, such as plasticizers, mould release agents, stabilizers, such as UV absorbers and antioxidants, intumescent auxiliaries (flameproofing agents), reinforcing fibres, such as glass fibres, carbon fibres or aramid fibres, fillers, inorganic or organic pigments, ceramic bases, carbon black etc., may also be added to the polyether sulphones according to the present invention, preferably in amounts of from 0 to 80, preferably from 0 to 60, wt.%, based on the polyether sulphone=100%, advantageously before processing of the polyether sulphones according to the present invention to shaped articles.

The low molecular weight polyether sulphones according to the present invention are particularly suitable, via their functional end groups (halogen or OH) for incorporation into block copolymers in association with other units which may be co-condensed.

According to the invention films having a thickness of from 1 to 1500 μm and preferably from 2 to 700 μm can be produced from these aromatic polyether sulfones.

The films obtained may be monoaxially or biaxially stretched in known manner, preferably in a ratio of from 1:1.5 to 1:3.

The films may be produced by known methods for the production of films, for example by extrusion of a polymer melt through a flat film die, by blowing in a film blowing machine, deep drawing or casting. For casting, a concentrated solution of the polymer in a suitable solvent is cast onto a flat substrate, the solvent is evaporated and the film formed is lifted off the substrate.

The films may be stretched in known manner using known machines at temperatures between room temperature and the softening point of the films.

The films according to the invention have a particularly high softening point and are permeable to many gases. Accordingly, they may be used as gas permeation membranes.

The films may be used on their own.

They may of course also be combined with other plastic films of, basically, any known type to form composite films.

Materials which give films combinable with the films according to the invention are described in the following. These materials are also referred to as component (b).

Thermoplastics suitable as component (b) are both b1) amorphous thermoplastics, preferably those having a glass temperature of more than 40° C. and more especially in the range from 60° C. to 220° C., and also b2) partially crystalline thermoplastics, preferably those having a melting temperature of more than 60° C. and more especially in the range from 80° C. to 400° C.

b3) polymers which have a glass temperature below 0° C., preferably below −10° C. and more especially in the range from −15° C. to −140° C.

Examples of amorphous thermoplastics b1) are amorphous polymers from the class of polycarbonates, polyamides., polyolefins, polyketones, polysulfones, thermoplastic vinyl polymers, such as polymethyl acrylates, or homopolymers of aromatic vinyl compounds, copolymers of aromatic vinyl compounds or graft polymers of vinyl monomers on rubbers, polyethers, polyimides, thermoplastic polyurethanes, aromatic polyester (carbonates) A and liquid crystalline polymers.

Examples of crystalline thermoplastics b2) are aliphatic-aromatic polyesters, polyarylene sulfides and the partially crystalline representatives of the thermoplastics listed above under b1).

Examples of elastomers b3) are the various rubbers, such as ethylene-propylene rubber, polyisoprene, polychloroprene, polysiloxanes, atactic polypropylene, diene, olefin and acrylate rubbers and natural rubbers, styrene-butadiene block copolymers, copolymers of ethylene with vinyl acetate or with (meth)acrylates, elastic polyurethanes, unless listed as thermoplastics under b1) or b2), and elastic polycarbonate-polyether block copolymers.

Amorphous thermoplastics b1) are, in particular, polycarbonates, including those according to German patent application p 3 832 396.6. polycarbonates may be both homopolycarbonates and also copolycarbonates and may be both linear and branched. The particularly preferred bisphenol for the thermoplastic polycarbonates of component b) of the mixtures according to the invention is bisphenol A [=2,2-bis-(4-hydroxyphenyl)-propane].

These other thermoplastic polycarbonates are known.

The molecular weights Mw (weight average molecular weight, as determined by gel permeation chromatography in tetrahydrofuran) of the thermoplastic polycarbonates are in the range from 10,000 to 300,000 and preferably in the range from 12,000 to 150,000.

The thermoplastic polycarbonates may be used both individually and in admixture for component b) of the mixtures according to the invention.

Preferred other thermoplastics (b) are also aliphatic-aromatic, thermoplastic polyesters, more preferably polyalkylene terephthalates, i.e. for example those based on ethylene glycol, propane-1,3-diol, butane-1,4-diol, hexane-1,6-diol and 1,4-bis-hydroxymethylcyclohexane.

The molecular weights ($\overline{M}w$) of these polyalkylene terephthalates are in the range from 10,000 to 80,000. The polyalkylene terephthalates may be obtained by known methods, for example from terephthalic acid dialkyl ester and the corresponding diol by transesterification (cf. for example U.S. Pat. Nos. 2,647,885, 2,643,989, 2,534,028, 2,578,660, 2,742,494, 2,901,466).

These polyesters are known. Preferred other thermoplastics also include thermoplastic polyamides.

Suitable thermoplastic polyamides are any partially crystalline polyamides, particularly polyamide-6, polyamide-6,6, and partially crystalline copolyamides based on these two components. Other suitable thermoplastic polyamides are partially crystalline polyamides of which the acid component consists completely or in part cf, in particular, adipic acid or caprolactam of terephthalic acid and/or isophthalic acid and/or suberic acid and/or sebacic acid and/or azelaic acid and/or dodecane dicarboxylic acid and/or adipic acid and/or a cyclohexane dicarboxylic acid, and of which the diamine component consists completely or in part, in particular, m- and/or p-xylylenediamine and/or hexamethylenediamine and/or 2,2,4- and/or 2,4,4-trimethyl hexamethylenediamine and/or isophoronediamine and of which the compositions are known in principle from the prior art (cf. for example Encyclopedia of Polymers, Vol. 11, pages 315 et sec.).

Other suitable thermoplastic polyamides are partially crystalline polyamides produced completely or in part from lactams containing 6 to 12 carbon atoms, optionally using one or more of the starting components mentioned above.

Particularly preferred partially crystalline polyamides are polyamide-6 and polyamide-6,6 or copolyamides containing a small amount (up to about 10% by weight) of other co-components.

Suitable polyamides are also amorphous polyamides obtained, for example, by polycondensation of diamines, such as for example hexamethylenediamines, decamethylenediamine, 2,2,4- and 2,4,4-trimethyl hexamethylenediamine, m- or p-xylylenediamine, bis-(4-aminocyclohexyl)-methane, mixtures of 4,4'-and 2,2'-diaminodicyclohexyl methanes, 2,2-bis-(4-aminocyclohexyl)-propane, 3,3'-dimethyl-4,4'-diaminodicyclohexyl methane, 3-aminoethyl-3,5,5-trimethyl cyclohexyl amine, 2,5-bis-(aminomethyl)-norbornane, 2,6-bis-(aminomethyl)-norbornane, 1,4-diaminomethyl cyclohexane, and of mixtures of these diamines, with dicarboxylic acids, such as for example oxalic acid, adipic acid, azelaic acid, decane dicarboxylic acid, heptadecane dicarboxylic acid, 2,2,4-trimethyl adipic acid, 2,4,4-trimethyl adipic acid, isophthalic acid and terephthalic acid, and with mixtures of these dicarboxylic acids. Accordingly, amorphous copolyamides obtained by polycondensation of several of the diamines and/or dicarboxylic acids mentioned above are also included.

Amorphous copolyamides prepared using ω-aminocarboxylic acids, such as ω-aminocaproic acid, ω-aminoundecanoic acid or ω-aminolauric acid, or lactams thereof, are also included.

Particularly suitable amorphous, thermoplastic polyamides are those obtainable from isophthalic acid, hexamethylenediamine and other diamines, such as 4,4'-diamino-dicyclohexyl methane, isophoronediamine, 2,2,4- and 2,4,4-trimethyl hexamethylenediamine, 2,5- and/or 2,6-bis-(aminomethyl)-norbornane; those obtainable from isophthalic acid, 4,4'-diaminodicyclohexyl methane and ω-caprolactam; those obtainable from isophthalic acid, 3,3-dimethyl-4,4'-di-aminodicyclohexyl methane and ω-lauric lactam; and those obtainable from terephthalic acid and the isomer mixture of 2,2,4- and 2,4,4-trimethyl hexamethylenediamine.

Instead of using pure 4,4'-diaminodicyclohexyl methane, it is also possible to use mixtures of the position-isomeric diaminodicyclohexyl methanes which consist of 70 to 99 mol-% of the 4,4'-diamino isomer,
1 to 30 mol-% of the 2,4'-diamino isomer,
0 to 2 mol-% of the 2,2'-diamino isomer
and, optionally, correspondingly more highly condensed diamines obtained by hydrogenation of diaminodiphenyl methane of technical quality.

Suitable thermoplastic polyamides may also consist of mixtures of partially crystalline and amorphous polyamides, the amorphous polyamide component being smaller than the partially crystalline polyamide component. The amorphous polyamides and their production are also known from the prior art (cf. for example Ullmann, Enzyklopädie der technischen Chemie, Vol. 19, page 50).

Preferred other thermoplastics b) also include thermoplastic, linear or branched polyarylene sulfides. They have structural units corresponding to the following general formula

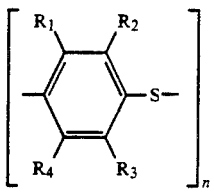

in which $R_1$ to $R_4$ may be independent or the same and represent $C_1$–$C_6$ alkyl, phenyl or hydrogen. The polyarylene sulfides may also contain diphenyl units.

Polyarylene sulfides and their production are known (see for example U.S. Pat. No. 3,354,129 and EP-OS 0 171 021).

Preferred other thermoplastics b) are thermoplastic polyarylene sulfones.

Suitable polyarylene sulfones have average weight average molecular weights $\overline{M}w$ (as measured by the scattered light method in CHCl$_3$) in the range from 1,000 to 200,000 and preferably in the range from 20,000 to 60,000.

Examples are the polyarylene sulfones obtainable in known manner from 4,4'-dichlorodiphenyl sulfone and a bisphenol, particularly 2,2-bis-(4-hydroxylphenyl)-propane, which have average weight average molecular weights Mw of from 2,000 to 200,000.

These polyarylene sulfones are known (cf. for example U.S. Pat. No. 3,264,536, DE-AS 1 794 171, GB-P 1,264,900, U.S. Pat. No. 3,641,207, EP-A-0 038 028, DE-OS 3 601 419 and DE-OS 3 601 420). The suitable polyarylene sulfones may also branched in known manner (cf. for example DE-OS 2 305 413).

Preferred other thermoplastics b) also include thermoplastic polyphenylene oxides, preferably poly-(2,6-dialkyl-1,4-phenylene oxides). Polyphenylene oxides suitable for the purposes of the invention have weight average molecular weights $\overline{M}w$ (as measured by the scattered light method in chloroform) of from 2,000 to 100,000 and preferably from 20,000 to 60,000. These polyphenylene oxides are known.

The preferred poly-(2,6-dialkyl-1,4-phenylene oxides) may be obtained in known manner by oxidizing condensation of 2,6-dialkylphenols with oxygen in the presence of catalyst combinations of copper salts and tertiary amines (see for example DE-OS 21 26 434 and U.S. Pat. No. 3,306,875).

Suitable poly-(2,6-dialkyl-1,4-phenylene oxides) are, in particular, the poly-[2,6-di-($C_1$–$C_4$-alkyl)-1,4-phenylene oxides], such as for example poly-(2,6-dimethyl-1,4-phenylene oxide).

Preferred other thermoplastics b) also include aromatic polyether ketones (cf. for example GB-P 1,078,234, U.S. Pat. No. 4,010,147 and EP-OS 0 135 938).

They contain the recurring structural element

—O—E—O—E'— in which —E'—0 is the residue of a bisaryl ketone having two bonds and —O—E—O— is a diphenolate residue having two bonds.

They may be obtained, for example, in accordance with GB-P 1,078,234 from dialkali diphenolates having the formula alkali—O—E—O—alkali and bis-(haloaryl)-sulfones having the formula hal—E'—hal (hal=halogen). One suitable dialkali diphenolate is, for example, that of 2,2-bis-(4-hydroxyphenyl)-propane, while a suitable bis-(haloaryl)-ketone is 4,4'-dichlorobenzophenone.

Preferred other thermoplastics b) also include thermoplastic vinyl polymers.

Vinyl polymers in the context of the invention are homopolymers of vinyl compounds, copolymers of vinyl compounds and graft polymers of vinyl compounds on rubbers.

Homopolymers and copolymers suitable for the purposes of the invention are those of styrene, α-methyl styrene, acrylonitrile, methacrylonitrile, $C_1$–$C_{12}$ (cyclo)alkyl esters of (meth)acrylic acid, $C_1$–$C_4$ carboxylic acid vinyl esters, the copolymers being obtainable from mixtures of these vinyl compounds by known methods.

The homopolymers or copolymers should have intrinsic viscosities of from 0.3 to 1.5 dl/g (as measured at 23° C. in toluene in known manner).

Suitable vinyl polymers are, for example, thermoplastic poly-$C_1$–$C_4$-alkyl methacrylates, for example those of methyl, ethyl, propyl or butyl methacrylate, preferably methyl or ethyl methacrylate. Both homopolymers and copolymers of these methacrylates are included. In addition, other ethylenically unsaturated, copolymerizable monomers, such as for example (meth)acrylonitrile, (α-methyl) styrene, bromostyrene, vinyl acetate, $C_1$–$C_8$ alkyl acrylate, (meth)acrylic acid, ethylene, propylene and N-vinyl pyrrolidone, may be copolymerized in small quantities.

The thermoplastic poly-$C_1$–$C_4$-alkyl methacrylates suitable for the purposes of the invention are known from the literature or may be obtained by methods known from the literature.

Suitable vinyl polymers also include copolymers of styrene or α-methyl styrene and acrylonitrile optionally containing up to 40% by weight of esters of acrylic or methacrylic acid, particularly methyl methacrylate or n-butyl acrylate. Styrene derivatives must always be present as monomers. The styrene derivatives are present in proportions of 100 to 10% by weight, preferably 90 to 20% by weight and more preferably 80 to 30% by weight and may be obtained by standard methods, such as radical polymerization in bulk, solution, suspension or emulsion, but preferably by radical emulsion polymerization in water.

Suitable graft polymers are formed by polymerization of the above-mentioned vinyl monomers or mixtures of vinyl monomers in the presence of rubbers having glass temperatures below 0° C. and preferably below −20° C. The graft polymers generally contain 1 to 85% by weight and preferably 10 to 80% by weight rubber. The graft polymers may be prepared by standard methods in solution, bulk or emulsion, preferably in emulsion; mixtures of vinyl monomers may be simultaneously or successively graft-polymerized.

Suitable rubbers are, preferably, diene rubbers and acrylate rubbers.

Diene rubbers are, for example, polybutadiene, polyisoprene and copolymers of butadiene with up to 35% by weight comonomers, such as styrene, acrylonitrile, methyl methacrylate and $C_1$-$C_6$ alkyl acrylates.

Acrylate rubbers are, for example, crosslinked, particulate emulsion polymers of $C_1$-$C_6$ alkyl acrylates, particularly $C_2$-$C_6$ alkyl acrylates, optionally in admixture with up to 15% by weight of other unsaturated monomers, such as styrene, methyl methacrylate, butadiene, vinyl methyl ether, acrylonitrile, and of at least one polyfunctional crosslinking agent, such as for example divinylbenzene, glycol-bis-acrylates, bis-acrylamides, phosphoric acid triallyl ester, citric acid triallyl ester, allyl esters of acrylic acid and methacrylic acid, triallyl isocyanurate, the acrylate rubbers containing up to 4% by weight of the crosslinking comonomers.

Mixtures of diene rubbers with acrylate rubbers and also rubbers having a core-shell structure are also suitable for the production of the graft polymers.

For graft polymerization, the rubbers must be present in the form of discrete particles, for example in the form of a latex. These particles generally have mean diameters of from 10 nm to 2000 nm.

The graft polymers may be produced by known methods, for example by radical emulsion graft polymerization of the vinyl monomers in the presence of rubber latices at temperatures of from 50 to 90° C. using water-soluble initiators, such as peroxodisulfate, or redox initiators.

Emulsion graft polymers produced by radical graft polymerization onto particulate, highly crosslinked rubbers (diene or alkyl acrylate rubbers) having gel contents of more than 80% by weight and mean particle diameters ($d_{50}$) of from 80 to 800 nm are preferred.

Technical ABS polymers are particularly suitable.

Mixtures of vinyl homopolymers and/or vinyl copolymers with graft polymers are also suitable.

Preferred other thermoplastics b) also include thermoplastic polyurethanes. These are reaction products of diisocyanates, completely or predominantly aliphatic oligo- and/or polyesters and/or ethers and one or more chain-extending agents. These thermoplastic polyurethanes are substantially linear and have thermoplastic processing characteristics.

The thermoplastic polyurethanes are known or may be obtained by known methods (cf. for example U.S. Pat. No. 3,214,411; J. H. Saunders and K. C. Frisch, "Polyurethanes, Chemistry and Technology", Vol. II, pages 299 to 451, Interscience Publishers, New York, 1964; and Mobay Chemical Corporation "A Processing Handbook for Texin Urethane Elastoplastic Materials", Pittsburgh, Pa.).

Starting materials for the production of the oligoesters and polyesters are, for example, adipic acid, succinic acid, sebacic acid, suberic acid, oxalic acid, methyl adipic acid, glutaric acid, pimelic acid, azelaic acid, phthalic acid, terephthalic acid and isophthalic acid.

Adipic acid is preferred.

Suitable glycols for the production of the oligoesters and polyesters are, for example, ethylene glycol, 1,2- and 1,3-propylene glycol, butane-1,2-, -1,3-, -1,4-, -2,3- and -2,4-diol, hexanediol, bis-hydroxymethyl cyclohexane, diethylene glycol and 2,2-dimethyl propylene glycol. In addition, small quantities, i.e. up to 1 mol-%, of trihydric or higher alcohols, for example trimethylol propane, glycerol, hexanetriol etc., may be used together with the glycols.

The resulting hydroxyl oligoesters or polyesters have a molecular weight of at least 600, a hydroxyl value of from about 25 to 190 and preferably from about 40 to 150, an acid value of from about 0.5 to 2 and a water content of from about 0.01 to 0.2%.

Oligoesters and polyesters also include oligomeric or polymeric lactones, such as for example oligocaprolactone or polycaprolactone, and aliphatic polycarbonates, such as for example polybutane-1,4-diol carbonate or polyhexane-1,6-diol carbonate.

A particularly suitable oligoester which may be used as starting material for the thermoplastic polyurethanes is prepared from adipic acid and a glycol containing at least one primary hydroxyl group. The condensation is terminated when an acid value of 10 and preferably of about 0.5 to 2 is reached. The water formed during the reaction is thus separated off simultaneously or afterwards, so that the final water content is between about 0.01 and 0.05% and preferably between 0.01 and 0.02.

Oligoethers and polyethers for the production of the thermoplastic polyurethanes are, for example, those based on tetramethylene glycol, propylene glycol and ethylene glycol.

Polyacetals may also be regarded as polyethers and may be used as such.

The oligoethers or polyethers should have average molecular weights $\overline{M}n$ (number average determined via the OH value of the products) of from 600 to 2,000 and preferably from 1,000 to 2,000.

4,4'-Diphenyl methane diisocyanate is preferably used as the organic diisocyanate for the production of the polyurethanes. It should contain less than 5% 2,4'-diphenyl methane diisocyanate and less than 2% of the dimer of diphenyl methane diisocyanate. In addition, the acidity, expressed as HCl, should be in the range from about 0.005 to 0.2%. The acidity expressed as % HCl is determined by extraction of the chloride from the isocyanate in hot, aqueous methanol solution or by liberation of the chloride during hydrolysis with water and titration of the extract with standard silver nitrate solution in order to obtain the concentration of chloride ions present therein.

It is also possible to use other diisocyanates for the production of the thermoplastic polyurethanes, including for example the diisocyanates of ethylene, ethylidene, propylene, butylene, cyclo-1,3-pentylene, cyclo-1,4-hexylene, cyclo-1,2-hexylene, 2,4-tolylene, 2,6-tolylene, p-phenylene, n-phenylene, xylene, 1,4-naphthylene, 1,5-naphthylene, 4,4'-diphenylene; 2,2-diphenylpropane-4,4'-diisocyanate, azobenzene-4,4'-diisocyanate, diphenylsulfone-4,4'-diisocyanate, dichlorohexamethylene diisocyanate, pentamethylene diisocyanate, hexamethylene diisocyanate, 1-chlorobenzene-2,4-diisocyanate, furfuryl diisocyanate, dicyclohexyl methane diisocyanate, isophorone diisocyanate, diphenyl ethane diisocyanate and bis-(isocyanatophenyl)-ethers of ethylene glycol, butanediol, etc.

Suitable chain-extending agents are organic difunctional compounds containing active hydrogen reactive to isocyanates, for example diols, hydroxycarboxylic acids, dicarboxylic acids, diamines and alkanolamines and water. Examples of such chain-extending agents are, for example, ethylene, propylene and butylene glycol, butane-1,4-diol, butanediol, butynediol, xylylene glycol, amylene glycol, 1,4-phenylene-bis-$\beta$-hydroxyethyl ether, 1,3-phenylene-bis-$\beta$-hydroxyethyl ether, bis-(hydroxymethylcyclohexane), hexanedio, adipic acid, $\omega$-hydroxycaproic acid, thiodiglycol, ethylenediamine, propylene, butylene, hexamethylene, cyclohexylene, phenylene, tolylene and xylylenediamine, diaminodicyclohexyl methane, isophoronediamine, 3,3'- dichlorobenzidine, 3,3'-dinitrobenzidine, ethanolamine, aminopropyl alcohol, 2,2-dimethyl propanolamine, 3-aminocyclohexyl alcohol and p-aminobenzyl alcohol. The molar ratio of oligoester or polyester to bifunctional chain extender is in the range from 1:1 to 1:50 and preferably in the range from 1:2 to 1:30.

In addition to difunctional chain-extending agents, it is also possible to use trifunctional or more than trifunctional chain-extending agents in small quantities of up to about 5 mol-%, based on mols of difunctional chain-extending agents used.

Examples of trifunctional or more than trifunctional chain-extending agents are glycerol, trimethylol propane, hexanetriol, pentaerythritol and triethanolamine.

Monofunctional components, for example butanol, may also be used for the production of the thermoplastic polyurethanes.

The diisocyanates, oligoesters, polyesters, polyethers, chain-extending agents and monofunctional components mentioned as structural units for the thermoplastic polyurethanes are either known from the literature or may be obtained by methods known from the literature.

The known production of the polyurethanes may be carried out, for example, as follows:

For example, the oligoesters or polyesters, the organic diisocyanates and the chain-extending agents may be individually heated, preferably to a temperature of from about 50 to 220° C., and then mixed. The oligoesters or polyesters are preferably first individually heated, then mixed with the chain-extending agents and the resulting mixture mixed with the preheated isocyanate.

The starting components for the production of the polyurethanes may be mixed by any mechanical stirrer which provides for intensive mixing in a short time. If the viscosity of the mixture should prematurely rise too quickly during stirring, either the temperature may be lowered or a small quantity (0.001 to 0.05% by weight, based on ester) citric acid or the like may be added to reduce the reaction velocity. To increase the reaction velocity, suitable catalysts, such as for example the tertiary amines mentioned in U.S. Pat. No. 2,729,618, may be used.

Preferred other thermoplastics are also so-called "LC" polymers. Polymers are polymers capable of forming liquid crystalline melts. Polymers of this type, which are also termed "thermotropic", are sufficiently well-known (see for example EP-PS 0 131 846, Ep-OS 0 132 637 and EP-OS 0 134 959). More literature is cited in these references which also describe determination of the liquid crystalline state of polymer melts.

Examples of LC polymers are aromatic polyesters based on optionally substituted p-hydroxybenzoic acid, optionally substituted iso- and/or terephthalic acids, 2,7-dihydroxy-naphthalene and other diphenols (EP-OS 0 131 846), aromatic polyesters based on optionally substituted p-hydroxybenzoic acid, diphenols, carbonic acid and, optionally, aromatic dicarboxylic acids (EP-OS 0 132 637) and aromatic polyesters based on optionally substituted p-hydroxybenzoic acid, 3-chloro-4-hydroxybenzoic acid, isophthalic acid, hydroquinone and 3,4'- and/or 4,4'-dihydroxydiphenyl, 3,4'- and/or 4,4'-dihydroxydiphenyl ether and/or 3,4'- and/or 4,4'-dihydroxydiphenyl sulfide (EP-OS 0 134 959).

The LC polymers have a persistence length at room temperature of from 18 to 1300 Å, preferably from 25 to 300 and more preferably from 25 to 150. The persistence length of a polymer at room temperature characterizes the average entanglement of a molecular chain in a dilute solution under theta conditions (cf. for example P. J. Flory, Principles of Polymer Chemistry, Cornell Univ. Press, Ithaca, New York) and half Kuhn's step length. The persistence length may be determined by various methods in dilute solutions, for example by light scattering and X-ray small angle measurements. After suitable preparation, the persistence length may also be determined by neutron small angle scattering in the solid. Other theoretical and experimental methods are described, for example, in J. H. Wendorff in "Liquid Crystalline Order in Polymers", e.g. A. Blumstein, Academic Press 1978, pages 16 et seg, and in the references cited in S. M. Aharoni, Macromolecules 19, (1986), pages 429 et seg.

Preferred elastomers b3) for component b) for the production of the mixtures according to the invention are the polyurethanes mentioned above, providing they are elastic, styrene-butadiene block copolymers which may be partially hydrogenated (for example Kraton G ®, a Shell product), the rubbers mentioned above for the graft polymers, the graft polymers themselves, providing they are elastic, and elastic polycarbonate-polyether block copolymers.

These elastomers are known.

The films or composite films may be flat, hollow, spherical, tubular and hollow-fiber-like. Films such as these are obtainable in known manner by thermoforming, deep drawing, blowing, etc.

The films according to the invention, particularly the composite films, are used for example for boil-proof and oven-proof, leak-proof packs and for microwave-proof packs, depending on which component b) is used for the composite film according to the invention.

The composite films according to the invention may be produced by co-extrusion of the thermoplastics with the polyether sulfones in a single operation.

The films according to the invention of polyether sulfones and the composite films according to the invention based on these films of polyether sulfones may be used as homogeneous membranes, composition membranes or asymmetrical membranes.

EXAMPLES

1. Preparation of bisphenol (A)

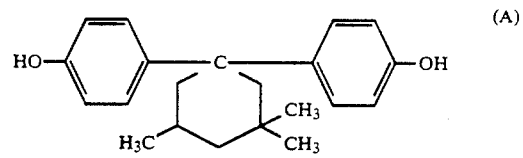
(A)

7.5 mol (705 g) phenol and 0.15 mol (30.3 g) dodecane-thiol are initially introduced into 1 liter round-bottomed flask with a stirrer, dropping funnel, thermometer, reflux condenser and gas line and are saturated with dry HCl gas at from 28 to 30° C. A mixture of 1.5 mol (210 g) dihydroisophorone and 1.5 mol (151 g) phenol is added dropwise to this solution at from 28 to 30° C. in the course of 3 hours, passage of HCl gas through the reaction solution being continued. When the addition has ended, HCl gas is introduced for a further 5 hours. The mixture is left to stand at room temperature for 8 hours to bring the reaction to completion. Excess phenol is then removed by steam distillation. The residue which remains is extracted hot twice with 500 ml (60-90) petroleum ether each time and once with 500 ml methylene chloride and filtered off.

Yield: 370 g, corresponding to 79%. Melting point: 205°-207° C.

2. Preparation of polyether sulphones according to present invention

EXAMPLE 2a 31.04 g (0.1 mol) of the above bisphenol (A), 28.72 g 4,4'-dichlorodiphenyl sulphone, 200 ml N-methyl-pyrrolidone, 100 ml toluene and 18 g potassium carbonate are initially introduced into a stirred apparatus which is flushed with nitrogen and provided with a water separator. The mixture is dehydrated by azeotropic distillation, until the batch is anhydrous. The bottom temperature is increased to 180° C. in the course of 1 hour by distillation off toluene. The batch is stirred at 180° C. for 4 h and then heated to from 190 to 195° C. for 1 h. It is then diluted with 200 ml N-methyl-pyrrolidone and the solid is filtered off hot with suction. The filtrate is neutralized with acetic acid and the polymer is isolated therefrom by precipitation in a methanol-water mixture (1:1). For further purification, the polymer is dissolved in methylene chloride and then precipitated in methanol. It is finally dried at 120° C. in vacuo for 14 h. Yield: 35.8 g; 25° C. at a polymer concentration of 5 g per liter; 1.19; glass transition temperature, determined with the aid of the DSC method at a rate of heating of 20 K/min: 236° C.

With the aid of so-called thermomechanical analysis (TMA) the softening properties of the sample were determined at a heating rate of 1K/min. by the penetrating action of a circular plunger (1 mm in diameter) and a superimposed load of 20 p. Only at temperatures of higher than 241° C. did the plunger penetrate the sample to any significant degree. Tensile strength, at room temperature on a S2 tensile bar at a rate of deformation of 2 mm/min 67 MPa. The materials showed very tough properties.

EXAMPLE 2b 15.52 g (0.05 mol) of the bisphenol of formula (A) 11.4 of bisphenol A (2,2-bis-(4-hydroxyphenyl)-propane; 0.05 mol), 28,72 g of 4,4'-dichlorodiphenyl-sulphone, 200 ml of N-methylpyrrolidone, 100 ml of toluene and 18 g of potassium carbonate are reacted together in a stirred apparatus as described in Example 2a following the procedure as than of Example 2a. After working up the mixture as in Example 2 a polysulphone with a relative solution viscosity of 1.160 (measured as in Example 2a) was isolated. The glass transition temperature—measured according to the DSC method was 213° C. According to TMA analysis the penetration point was about 218° C.

EXAMPLE 2c

Following the same procedure as in Example 2a polysulphone segment containing terminal OH groups was produced (yield: 213.3 g) from 232.83 g of the bisphenol of formula (A), 172.3 g of 4,4'-dichlorodiphenyl-sulphone, 1200 ml of N-methylpyrrolidone, 600 ml of toluene and 135 g of potassium carbonate. The molecular weight, determined by steam pressure osmometry in methylene chloride, was 1500 g/mol and the relative solution viscosity, determined as described in Example 2a was: 1.040.

EXAMPLE 2d 137.2 g of the bisphenol of formula (A), 159.1 g of 4,4'-dichlorodiphenylsulphone, 880 ml of N-methyl-pyrrolidone, 440 ml of toluene and 79.56 g of potassium carbonate were reated together as described in Example 2a. Then 32.16 g of 4,4'-dichlorodiphenylsulphone were added and the mixture was stirred for a further hour at 190° C. After working up as in Example 2a, 134.0 g of a polysulfone segment containing terminal chlorine groups were isolated. The molecular weight, determined as described in Example 2c, was 1.600 g/mol and the relative solution viscosity, determined in Example 2a, was 1.045. The chlorine content was 3.3% by weight.

EXAMPLE 2e 31.04 g of the bisphenol of formula (A), 28,72 g pf 4,4'-dichlorodiphenylsulphone, 200 ml of N-methyl-caprolactam, 100 ml of toluene and 18 g of potassium carbonate were reated together as described in Example 2a. Then the mixture was stirred for a further hour at 210° C. and then for one hour at 230° C. After working up as in Example 2a, 39.4 g of polyether sulphone were isolated; the relative solution viscosity was 1.131, measured as described in Example 2a), the glass transition temperature, measured by the DSC method, was 228° C. and the TMA softening point, determined as described in Example 2a, was 230° C.

3. Comparison Examples

Polyether sulphones were prepared from the diphenols (B) and (C) analogously to Example 2. The values were determined as for Example 2.

3(a) Polyether sulphone from the bisphenol (B)

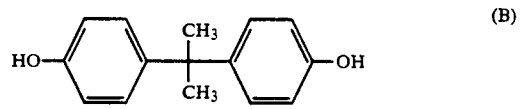

(B)

Glass transition temperature: 190° C., tensile strength at room temperature on a S2-tensile bar at a rate of deformation of 2 mm/min is: 53 MPa.

3(b) Polyether sulphone from the bisphenol (C)

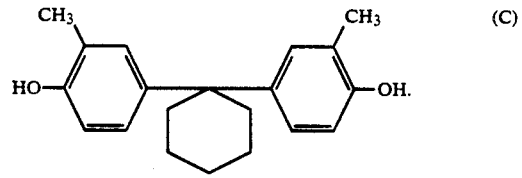

(C)

Glass transition temperature: 195° C., the material has a tensile strength of 55 MPa, measured on an S2-tensile bar at room temperature and a rate of deformation of 2 mm/min.

4.

After heating for 5 minutes at 220° C., the polyether sulfone 2a) was press-molded at 225° C. under a pressure of 200 bar to form a 500 μm thick film. After storage for 2 hours (in vacuo at 100° C.), the permeability of a homogeneous-looking, round piece of this film (total surface area approx. 4 cm$^2$) to oxygen, carbon dioxide, methane and nitrogen was measured. Pressure-measuring capacitors were used as detectors. Permeability (P) was measured in units

| $\frac{cm^3 \cdot mm}{m^2 \cdot 24 \, h \cdot 10^5 \, Pa}$ | |
|---|---|
| (temperature = 23° C.). | |
| Result: | |
| P(oxygen) = | 214.3 |
| P(methane) = | 51.6 |
| P(carbon dioxide) = | 14.5 |

The film was dimensionally stable at 230° C.

5. Comparison Examples

Comparative Example 5a

Following the same procedure as under 4, a film was produced from the polyether sulphone of comparative example 3a, prepared differently from that according to the invention, and the permeability was measured (film thickness: about 100 μm):

permeability to oxygen: 500
permeability to carbon dioxide: 270.0

The film was no longer dimensionally stable at temperatures of higher than about 200° C.

Comparative Example 5b

After dissolution in 100 ml methylene chloride and thickening of the resulting solution by partial evaporation of the solvent, polycarbonate based on bisphenol A (relative solution viscosity 1.28, as measured in methylene chloride at 25° C. for a polymer concentration of 0.5 g/dl, glass temperature 146° C., as measured by DSC) was made into a 154 μm thick film by pouring out the thickened solution onto a glass plate. The permeability of the film was measured (room temperature) as in 3, after drying (in vacuo for 2 hours at 100° C.).

| Result: | P(oxygen) = | 72.0 |
|---|---|---|
| | P(CO₂) = | 366.0 |

The film was not dimensionally stable above 150° C.

6. Production of a composite film according to the invention

The films of Example 4, according to the invention and Comparison Example 3, were heated for 5 minutes and then press-molded at 150° C. under a pressure of 280 bar to form a 250 μm thick composite film. The permeability of this composite film was measured and described in Example 4.

| Result: | P(oxygen) = | 165.3 |
|---|---|---|
| | P(CO₂) = | 691.0 |

The film was still dimensionally stable at 210° C.

We claim:

1. An aromatic polyether sulfone having the recurring structural unit

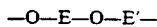

wherein —E'— represents a divalent radical of an aromatic sulfone corresponding to the formula

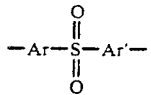

wherein Ar and Ar' represent identical or different difunctional aromatic radicals having from 6 to 50 carbon atoms, and wherein —O—E—O— represents a divalent diphenolate radical;

wherein from 0.1 to 100 mol% of said diphenolate radicals —O—E—O— correspond to the general formula

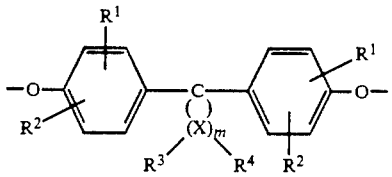

wherein $R^1$ and $R^2$ independently represent hydrogen, halogen, $C_1$-$C_8$ alkyl, $C_5$ or $C_6$ cycloalkyl, $C_6$-$C_{10}$ aryl, or $C_7$-$C_{12}$ aralkyl;

m represents an integer of from 4 to 7;

$R^3$ and $R^4$ are selected individually for each X and independently represent hydrogen or $C_1$-$C_6$ alkyl; and X represents carbon;

with the proviso that, on at least one atom X, $R^3$ and $R^4$ both represent alkyl.

2. An aromatic polyether sulfone according to claim 1 having an average molecular weight $\overline{M}_w$ of from 758 to 500,000.

3. An aromatic polyether sulfone according to claim 1 wherein from 3 to 100 mol% of the diphenolate radicals —O—E—O— are diphenolate radicals corresponding to the general formula

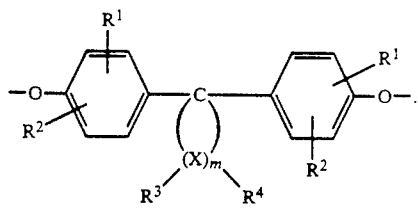

4. An aromatic polyether sulfone according to claim 1 wherein from 10 to 100 mol% of the diphenolate radicals —O—E—O— are diphenolate radicals corresponding to the general formula

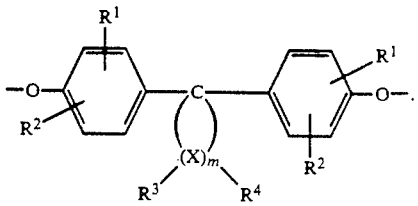

5. A 1 to 1500 μm thick film of a polyester sulfone based on a diphenol corresponding to the formula

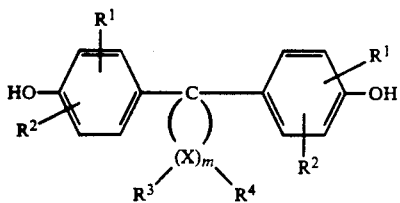

wherein
- $R^1$ and $R^2$ independently represent hydrogen, halogen, $C_1-C_8$ alkyl, $C_5$ or $C_6$ cycloalkyl, $C_6-C_{10}$ aryl, or $C_7-C_{12}$ aralkyl;
- m represents an integer of from 4 to 7;
- $R^3$ and $R^4$ are selected individually for each X and independently represent hydrogen or $C_1-C_6$ alkyl; and
- X represents carbon;

with the proviso that, on at least one atom X, $R^3$ and $R^4$ both represent alkyl.

6. A film according to claim 5 wherein one or more of $R^1$ and $R^2$ are chlorine or bromine.

7. A film according to claim 5 wherein m is 4 or 5.

8. A film according to claim 5 wherein said film is mono- or biaxially stretched in a ratio of 1:1.5 to 1:3.0.

9. A composite film of a film according to claim 5 and a film of another plastic.

10. In the preparation of aromatic polyether sulphones, the improvement comprising using a diphenol corresponding to

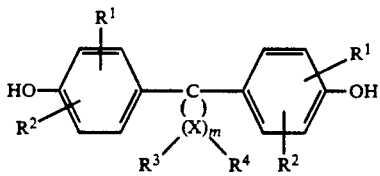

(I)

wherein
- $R^1$ and $R^2$ independently represent hydrogen, halogen, $C_1-C_8$ alkyl, $C_5$ or $C_6$ cycloalkyl, $C_6-C_{10}$ aryl, or $C_7-C_{12}$ aralkyl;
- m represents an integer of from 4 to 7;
- $R^3$ and $R^4$ are selected individually for each X and independently represent hydrogen or $C_1-C_6$ alkyl; and
- X represents carbon;

with the proviso that, on at least one atom X, $R^3$ and $R^4$ both represent alkyl.

* * * * *